United States Patent [19]
van Essen

[11] Patent Number: 4,579,013
[45] Date of Patent: Apr. 1, 1986

[54] DEVICE FOR DRIVING A CONVEYOR ACCORDING A PATTERN OF UNEQUAL SEPARATE STEPS

[75] Inventor: Henk van Essen, Barneveld, Netherlands

[73] Assignee: Moba Holding Barneveld, B.V., Barneveld, Netherlands

[21] Appl. No.: 350,182

[22] Filed: Feb. 19, 1982

[30] Foreign Application Priority Data
Feb. 27, 1981 [NL] Netherlands ............... 8100972

[51] Int. Cl.⁴ ............ F16H 31/00; F16H 27/00; F16D 27/10; B65G 23/28
[52] U.S. Cl. .................... 74/113; 198/859; 74/111; 74/125.5
[58] Field of Search .......... 74/111, 112, 113, 125.5, 74/84 R, 63, 821, 813 L; 198/858, 859

[56] References Cited
U.S. PATENT DOCUMENTS

| | | | |
|---|---|---|---|
| 1,116,406 | 11/1914 | Fleischer | 198/859 |
| 1,131,460 | 3/1915 | Bauwens | 198/859 |
| 2,552,246 | 5/1951 | Wilckens et al. | 198/859 |
| 2,559,945 | 7/1951 | Chaplin | 198/859 |
| 2,794,532 | 6/1957 | Snow | 198/859 |
| 2,847,113 | 8/1958 | Dumas | 198/135 |
| 3,338,377 | 8/1967 | Richter et al. | 198/135 |
| 3,795,189 | 3/1974 | Jaffa | 198/859 |
| 4,116,328 | 9/1978 | Horvath et al. | 198/648 |

FOREIGN PATENT DOCUMENTS

| | | |
|---|---|---|
| 1960136 | 6/1971 | Fed. Rep. of Germany . |
| 308367 | 7/1955 | Switzerland . |
| 788499 | 1/1958 | United Kingdom . |
| 874898 | 8/1961 | United Kingdom . |
| 1557542 | 12/1979 | United Kingdom . |

Primary Examiner—Lawrence J. Staab
Assistant Examiner—Michael D. Bednarek
Attorney, Agent, or Firm—Larson and Taylor

[57] ABSTRACT

A device for activating the one or the other of two movement transfer devices, both driving the same output shaft, at least one of said movement transfer devices having a cam disc to create a desired velocity characteristic, control means controlled by said output shaft being present to activate or disable the connection between a command member and means for controlling clutches in said movement transfer devices and a step regulating means connected to said output shaft.

7 Claims, 4 Drawing Figures

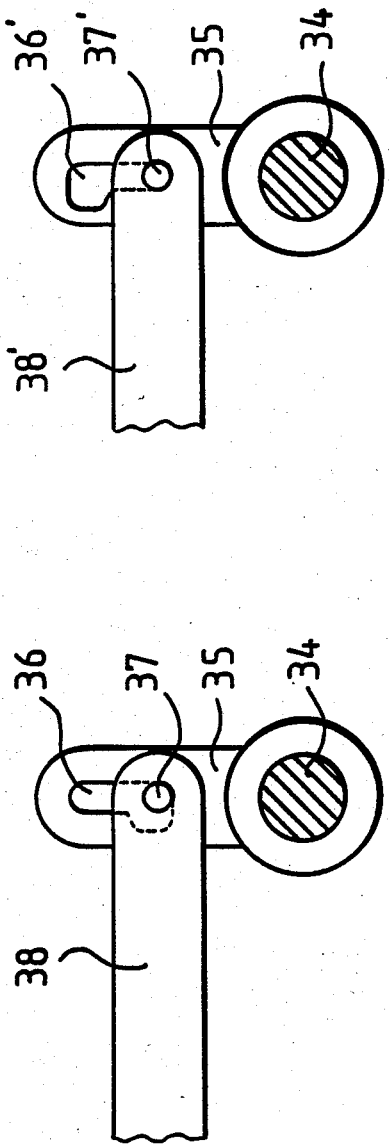

DEVICE FOR DRIVING A CONVEYOR ACCORDING A PATTERN OF UNEQUAL SEPARATE STEPS

The invention relates to a device for intermittently moving an output shaft having a continuously driven input means, at least two movement transfer devices for driving the output shaft over predetermined movement steps, at least one of said movement transfer devices being provided with a cam and a cam follower for realizing a predetermined "velocity function" of the output shaft, i.e., for producing predetermined rotation of that shaft. Such a device has been described in the British Patent Specification No. 874,898 to Burgess.

Such devices on the one hand allow for a desired velocity function of the output shaft by a suitable shaping of the cam, but are not suitable for applications in which the moment at which the next movement step should be made is controlled from outside the device. The latter is, for instance, the case with packing devices used with egg sorting machines, which at irregular intervals, required a shift of the carton or package after filling a row of egg pockets therein. This shift is of quite different length in the case wherein a package has been filled and should be replaced, as compared with the case where only one row of pockets has been filled.

The great step occurring with replacement of the package may cause problems because of large accelerations and decelerations leading to noise, shocks and usage of the device or to an undue limitation of the working speed.

The invention aims to provide a device of the indicated type that is suitable for external step control and allows for a high operating speed, and also for the larger steps.

The above aim is according to the invention attained by providing that clutches are present between the input means and the said movement transfer devices and clutch control means for activating the one clutch or the other, said control means containing step regulating means for declutching the related clutches after a predetermined movement step.

It is remarked that from the British Patent Specification No. 788,499 to Baker Perkins a stepwise drive of two chains is known in which the steps of both chains are controlled by specially shaped ratchet wheels such that a predetermined pattern is realized. No means are provided for commanding the steps from outside.

Further the British Patent Specification No. 1,557,542 to Shinohara et al shows a device with a double cam to drive two mutually coupled chains with steps having different velocity functions.

A reliable and simple embodiment of the invention can be obtained by providng that the clutches are spring band clutches and the step regulating means combine step discs cooperating with related pawls. Such spring band clutches are commercially available and will further on be described in detail. The advantage of this embodiment is that always exactly the same position of the clutch output member is obtained, independently of small deviations in the behaviour of the clutches.

To maintain after each step the exact angular position of the output shaft, including situations when the high speed of some of the steps could cause some overshooting, it is provided that between the movement transfer devices and the output shaft a further clutch is provided having a program disc with stop members cooperating with a pawl that is controlled by a command means, which command means also controls the said clutch control means. This feature also allows for some overdimensioning of the steps of the movement transfer devices, which feature simplifies design problems and problems due to usage of the device that could alter the steps a little.

A further advantage of the invention is that modification of programs or even adjustment to several programs is rather easy.

Accordingly it is preferably provided that the program disc has a number of sets of stop members, each set being located on a predetermined circular portion of said disc, said circular portions being juxtapositioned. An adjustment means provides that stop members of an elected set cooperate with a pawl controlled by said command means. The related movement transfer device is provided with a number of cams and the adjustment means is adapted to activate one of said cams.

A simple embodiment of the control means for activating the one clutch or the other is obtained through the provision of a control member fixedly connected to the output shaft and controlling a switch mechanism for providing a functional connection between the command means and the clutch control means of one of the first mentioned clutches and for disabling the connection between the command means and the clutch control means of the other of the first mentioned clutches and for disabling the connection between the command means and the clutch control means of the other of the first mentioned clutches.

The invention in the following is further explained in connection with the drawing, in which:

FIGS. 3 and 4 each show a detail on a larger scale.

Figure 1:
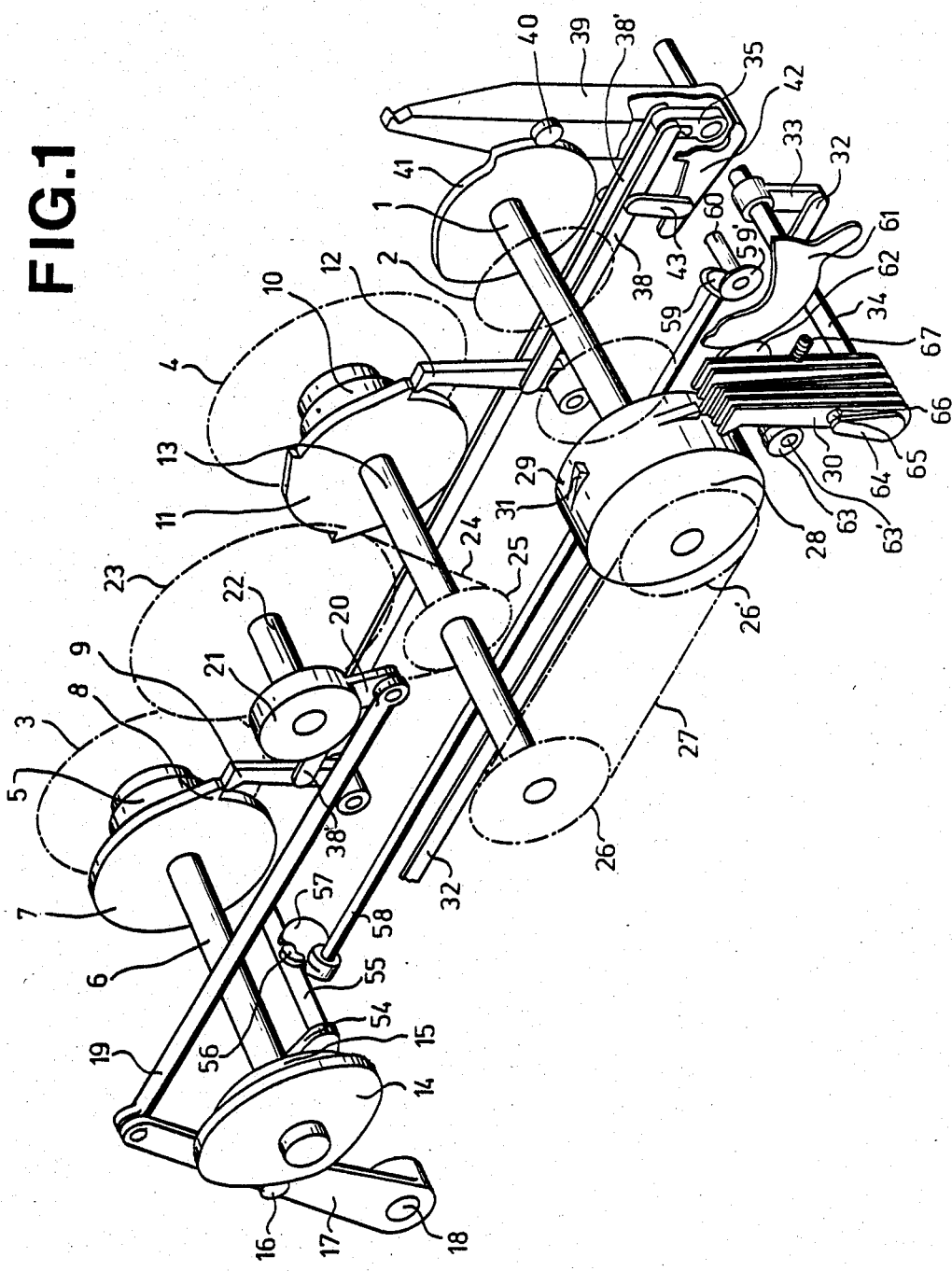
FIG. 1 is a perspective view of a device according the invention.

In FIG. 1 reference 1 indicates the output shaft of a driving device, on which chain wheels 2 are fixedly mounted, which are directly coupled to a (non shown) transport belt.

Reference 3 is a continuously driven gear which via a friction clutch 5 can be coupled to a driving shaft 6. Fixedly connected to shaft 6 is a disc 7 with an abutment or notch 8 with which a pawl 9 can cooperate. The friction clutch 5, a so called spring band coupling, is made such that when the pawl 9 arrests the disc 7, the clutch is declutched, by reason of which the shaft 6 is not rotated. If, however, the pawl 9 is retracted, then the disc 7 begins to rotate a little under influence of the spring clutch, by reason of which the shaft 6 is coupled to the driven gear 3. When the disc 7 has rotated through a complete revolution or, in the case where more than one notch or abutment is provided on disc 7, over the distance between two abutments or notches 8, the pawl 9 becomes active again, the disc 7 is arrested and the friction clutch 5 automatically declutched. The shaft 6 cannot freely rotate when disc 7 is arrested or blocked.

An analogous drive is provided by the continuously driven gear 4 in cooperation with friction clutch 10 and a disc 11 and pawl 12 this arrangement permitting rotation of shaft 13 through an exactly predetermined stroke which may be a complete revolution or a predetermined part thereof. As will be explained further on, the output shaft 13 can rotate when disc 11 is arrested or blocked.

On the shaft 6 a cam disc 14 is mounted with a number juxta-positioned cam discs 15, of which one has been shown in the drawing, such that a selected one of the cam discs 15 or 14, depending on the axial position of these cam discs, cooperates with a follow roller 16 borne by an arm 17, which can pivot about a fixed pivot point 18. A link 19 is connected to arm 17 and is coupled to an arm 20 which via a freewheel clutch 21 drives a shaft 22 on which a driving wheel 23 is mounted. Wheel 23, via a belt or chain 24, drives a driven wheel 25 that is coupled to the shaft 13. Fixed on this shaft is a gear or disc 26 that via a chain or belt 27 drives a gear 26' that is rotably mounted to output shaft 1.

The gear 26' forms the driven part of a spring band clutch 28 of the same type as spring band clutch 5. This coupling 28 cooperates with a program disc 29. This disc 29 is provided with abutment protrusions or stop members 31, that can cooperate with pawls 30. Only one of these pawls (in the illustrated embodiment the middle one) is free to cooperate with an associated one of the stop members 31. Stop members which cooperate with the other pawls have not been shown in the drawing for clarity's sake. Each pawl 30 is urged toward the program disc 29 by a pressure spring 67 of which only one has been shown in the drawing. Cam discs 63, however, prevent all pawls except, in the illustrated embodiment, the middle one to cooperate with the abutment protrusions 31 adjoined to them, i.e., with the abutment 31 which corresponds to and is aligned with that pawl. Consequently program disc 29 is only stopped by this middle pawl in the example illustrated and can, when this pawl is retracted, move one step further thus carrying out a predetermined part of a revolution. Thus, the amount of rotation is determined by the location of the stop members 31.

The choice of the active pawl 30 and the cam disc 15 or 14 for carrying out a predetermined stroke of the program disc 29 by means of the stop members 31 mounted in a circumferential circle of the program disc 29 and the movement appertaining thereto and generated by a cam disc 15 or 14 is determined as explained below.

To the cam discs 14 and 15, which are axially shiftably but not rotatably mounted to shaft 6, an arm 54 is connected which does not follow the rotational movement of the shaft 6 and the cam discs 14 and 15 but rather is axially coupled to the latter. To this arm 54 a rod 55 is mounted that bears a follow roller 56. This follow roller cooperates with a cam 57 of the type having a closed groove, which cam is fixedly mounted to a shaft 58. This shaft is by means of conical gears 59 and 59' coupled to a shaft 60 which supports an adjustment member 61 that is shown partly broken away in the drawing.

This adjustment member 61 is directly coupled to shaft 60 (although because, as noted above, member 61 is partly broken away, this direct coupling is not specifically shown) and consequently to shaft 58. A toothed section (not shown) that engages with a gear 62 also provides coupling to a further shaft 63' which bears a number of cam discs 63 have such a form that all pawls except one are permanently retracted against the biassing adction of the spring 67 coopreating with them.

The whole device is controlled by a command rod 32 which, each time that the drive has to move a step, is subjected to a small axial displacement to and fro, which is transmitted to an arm 33 which is fixedly mounted to a control shaft 34 on which an arm 64 is mounted. This arm 64 supports a pin 65 which passes through slits in the pawls 30. Activation of command rod 32 and the pivoting movement of the arm 64 caused thereby, results in the active pawl 30 being retracted because the pin 65 engages the end of the related slit 66 of the active pawl 30 whereas this pin can freely move in the slits of the pawls already retracted.

A predetermined adjustment of the adjustment member 61 consequently leads to choosing a program for the program disc 29 and the related choice of cam disc 14, 15, so that each activation of command rod 32 causes the pawl 30 relating to said program to be retracted.

Further, arms 35 are connected to a control shaft 34 as is shown on a larger scale in FIGS. 3 and 4 and a slit 36 is provided in one arm 35 which includes at its lower end, a broad portion, and a portion thereabove that gradually converges to a smaller portion. A pin 37 extends into slit 36 which is connected to the rod 38 that is coupled to pawl 12. In the same way in the other arm 35 a slit 36' also provided by means of which a pin 37 is coupled to a rod 38', the slit being, however, of an orientation opposite to that of slit 36, i.e., with the broad or wide portion uppermost.

Freely rotatable on control shaft 34 an arm 39 is mounted bearing a follow roller 40 running on a cam 41 fixedly keyed on output shaft 1. With arm 39 arms 42 are connected which via links 43 lift the connection rods 38 and 38' when the arm 39 is pivoted by cam 41. For clarity's sake only cooperating arm 42 and link 43 are shown in the drawing. Lifting of the rods 38 and 38' and consequently to pawl 12 or 9.

Figure 2:
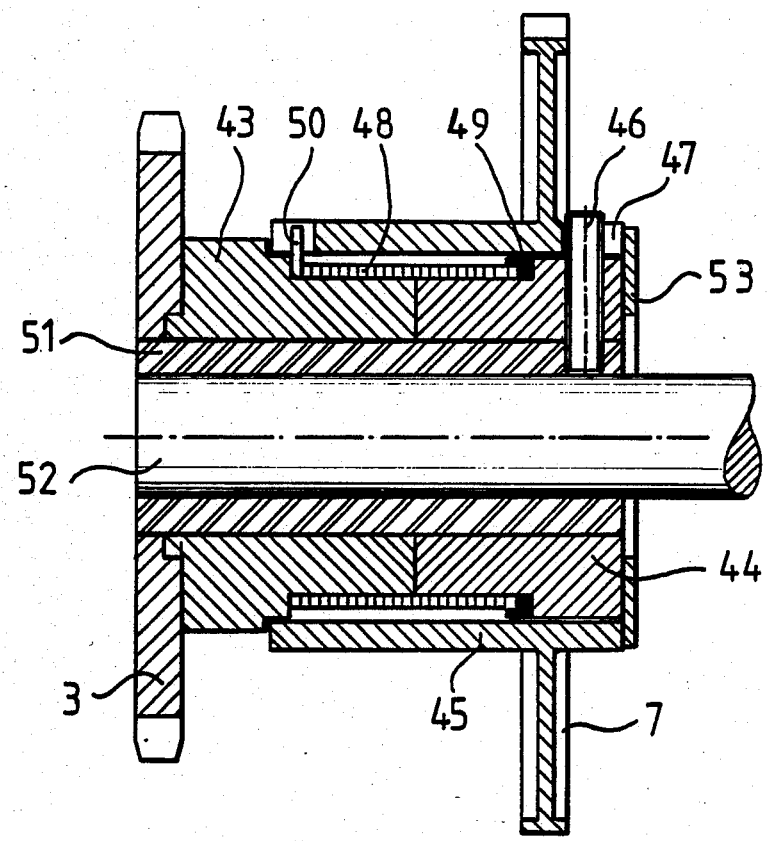
FIG. 2 shows a cross-section through a clutch that is applied in the invention.

The spring band clutch 5 indicated in FIG. 2 includes a smaller diameter extension 52 of the shaft 6 on which a sleeve 51 is keyed. About this sleeve a first house part 73 is freely rotatable with the permanently driven gear 3 fixedly connected to it. A second house part 44 is fixedly connected to the sleeve 51 and consequently via the extension 52 to the shaft 6. On this house part 44 a hub 45 is rotatable which bears the disc 7. Rotation of the hub 45 with respect to the house part 44 is restricted by a screw 46 screwed into this house part 44. Screw is located in an opening 47 in the hub 45, the tangential length of the opening or slot 47 restricting the movement which the disc can undergo with respect to the house part 44 and consequently the shaft 6, to, in practice, a small angle. A clutch spring 48 with a rectangular cross-section is fixedly connected to the house part 44 by means of a clamping ring 49. The other end 50 of the spring 48 protrudes into a slit in the hub 45 and is thus coupled to said hub.

The working of this clutch is the following: When gear 3 is driven in a suitable sense and the disc 7 is blocked, friction if any between the driven house part 73 and the windings of the spring 48 opposite it causes the spring to unwind thus completing the declutching operation.

When the disc 7 is unlocked or declutched the spring can provide some rotation of disc 7, and a resultant limited winding of the spring thus occurs whereby the spring engages the house parts 73 and 44, which thereby are coupled to each other, so that gear 3 is coupled to the extension 52 and consequently to the shaft 6. When the disc 7 is stopped again the spring unwinds slightly because of inertia forces, and decoupling occurs. Because the disc 7 never has more play than that corresponding to the tangential length of the opening 47 the position of the shaft with respect to the disc 7 remains the same, even after long periods of use, except for the small play provided. Such clutches are commercially available.

The clutch 10 can be of the same type as discussed above but with the clamping ring 49 and the screw 46 removed, and a sheet member 53 providing axial confinement of hub 45. With this arrangement the driven gear 4 (corresponding to gear 3) is decoupled from the shaft 13 when the disc 11 (corresponding to disc 7) is blocked, but the shaft 13 can still rotate when the disc 11 is blocked.

Clutch 28 is identical to clutch 5. With these clutches a number of advantages is obtained:

(1) the shaft 6 has, even after very long periods of use of the device, and angular position which corresponds, within predetermined limits, with that of disc 7. Because of this cam disc 14 has always an angular position that corresponds to that of the disc 7.

(2) The shaft 13 can rotate with respect to disc 11, so that this shaft can be used to transmit, with one single transmission, the movement originating from gears 3 and 4.

(3) The clutch 28 maintains correspondence of the angular position between shaft 1 and the disc 29 within fixed limits.

(4) Because the gear 26' can lead with respect to disc 29 it is possible to dimension the driving strokes for the shafts 6 and 13, respectively in a manner which allows operating margins to be introduced, and thereby guarantee reliable operation of the whole device. This is important where, for example, one of the clutches for whatever reason exhibits a variation of the angle through which the driven part rotates before the coupling with the associated shaft takes place. The margins mentioned in subparagraph (4) allow the program determined by the abutments 31 on the disc 29 to be modified within relatively broad limits without the need for modification of the gears 3 and 4 or for changing the number of abutments or notches corresponding to abutments or notches 8 on the disc 7 or 11.

The working of the described device is the following. When the gears 3 and 4 are continuously driven the command rod 32 receives a pulse, by reason of which, determined by cam 41, the pawl 12 is retracted a moment and the disc 11 carried out a revolution that via the gears 26 and 26' is transmitted to the output shaft 1. The arrangement is so devised that rotation of shaft 1 only stops after that the active pawl 30 has engaged the next abutment of programs disc 29. This operation is repeated until the cam 41, which has a varying radius as shown in FIG. 1, rotates to a position wherein the radius of the portion thereof is engagement with roller 40 changes after which the arm 39 is pivoted and consequently the arms 42, via the links 43, cause the rods 38 and 38' to move downward, so that the next pulse of command rod 32 is transmitted to pawl 9. This causes the shaft 6 to be driven and shaft 6 consequently drives the cam discs 14 and 15, one of which, via follow roller 16, causes the arm 17 to pivot. Pivoting of arm 17 causes the shaft 22, through the action of arms 17 and link 19, to undergo a rotational movement which is determined by the shape of the related cam disc 14 or 15.

This rotational or pivoting movement of shaft 22 is, via the gears 23 and 25, the shaft 13 and the gear 26, again transmitted to gear 26', so that shaft 1 rotates one step. After the end of this movement, the reduced radius portion of the cam 41 has passed by and the arm 39 again takes its former position so that again a number of small steps can be made which are carried out via pawl 12 and the shaft 13.

The cam discs 14 and 15 and the pawls 30 have to be adjusted when a new program is set. This can be done very simply by adjusting the adjustment member 16, so that when a selected pawl 30 is activated, the associated cam disc 14 or 15 simultaneously cooperates with follow roller 16. The shift of the cam discs 14 and 15 can be made easier by choosing the cam shapes such that in the position in which the cams are idle they present the same radius to follow roller 16. In other respects the shape of these cams can be freely chosen, so that a desired velocity function for the rotation of the output shaft 1 can be obtained.

For this reason, for the same operational speed of the device, a smoother, more shock-free and quieter operation is possible or a higher operational speed can be provided without producing too great an acceleration together with the undesired effects accompanying this.

What I claim is:

1. Device for intermittently moving an output shaft, said device comprising a said output shaft, a continuously driven input means, at least first and second alternately activated movement transfer devices connected to said input means for, when activated, driving the output shaft over predetermined movement steps, the length of the movement step provided by said first movement transfer device, differing from that of the movement step provided by said second movement transfer device, at least one of said movement transfer devices including a cam and a cam follower for providing the predetermined movement step, at least one controllable clutch disposed between the continuously driven input means and said first movement transfer device, at least one further controllable clutch disposed between the continuously driven input means and the second movement transfer device, and clutch control means for activating one of said controllable clutches or the other such that the movement transfer device associated with the activated clutch drives said output shaft, said clutch control means including step regulating means for declutching the controllable clutch activated thereby after a predetermined movement step.

2. Device according to claim 1, in which the clutches are spring band clutches and the step regulating means comprise discs cooperating with related pawls.

3. Device according to claim 1, in which the output member driven by one of the clutches is free to rotate forward and is coupled to the output of the other clutch.

4. Device according to claim 1, in which between the movement transfer devices and the output shaft a further clutch is provided having a program disc with stop members cooperating with a pawl that is controlled by a command means, which command means also controls the said clutch control means.

5. Device according to claim 4, in which the program disc has a number of sets of stop members, each set being located on a predetermined circular portion of said disc, said circular portion being juxta positioned, and an adjustment means being provided ensuring that the stop members of an elected set cooperate with a pawl controlled by said command means.

6. Device according to claim 5, in which the related movement transfer device is provided with a number of cams and the adjustment means is adapted to activate one of said cams.

7. Device according to claim 1, in which the control means for activating the one clutch or the other contains a control member fixedly connected to the output shaft controlling a switch mechanism for providing a functional connection between the command means and the clutch control means of one of the first mentioned clutches and disabling the connection between the command means and the clutch control means of the other of the first mentioned clutches.

* * * * *